United States Patent Office 2,734,895
Patented Feb. 14, 1956

2,734,895

COBALTIFEROUS AZO-DYESTUFFS

Christian Zickendraht, Binningen, and Arthur Buehler, Rheinfelden, Switzerland, assignors to Ciba Limited, Basel, Switzerland, a Swiss firm No Drawing. Application August 4, 1952,
Serial No. 302,612

Claims priority, application Switzerland August 14, 1951

15 Claims. (Cl. 260—149)

According to this invention valuable new cobaltiferous azo-dyestuffs are made by treating a monoazo-dyestuff which is free from sulfonic acid and carboxylic acid groups and corresponds to the general formula

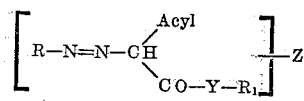

in which R represents an aromatic radical of the benzene series which contains a hydroxyl group in ortho-position relatively to the azo-linkage, Y represents an oxygen atom or an —NH— or -N-alkyl-group, $R_1$ represents an aliphatic, cycloaliphatic or aromatic radical, and Z represents an aromatically bound sulfonic acid amide group, and in which, when Z represents an —$SO_2NH_2$-group, Y represents an -N-alkyl-group or the dyestuff molecule contains a further aromatically bound substituted sulfonic acid amide group or an aromatically bound substituent not imparting solubility in water, advantageously a halogen atom, with an agent yielding cobalt in such manner that the resulting cobaltiferous dyestuff contains less than one atom of cobalt in complex union per molecule of monoazo-dyestuff.

The monoazo-dyestuffs used as starting materials in the present process and corresponding to the above formula can be made by coupling an ortho-hydroxy-diazo-compound of the benzene series free from sulfonic acid and carboxylic acid groups, and advantageously one containing a sulfonic acid amide group, with an acylacetic acid ester or amide, which is also free from sulfonic acid and carboxylic acid groups and which must contain a sulfonic acid amide group if the ortho-hydroxy-diazo-compound contains no sulfonic acid amide group.

Among sulfonic acid amide groups there are to be understood substituted or unsubstituted sulfonic acid amide groups, that is to say, those of the formula

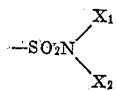

in which $X_1$ represents a hydrogen atom or an aliphatic radical, and $X_2$ represents a hydrogen atom, an aliphatic, alicyclic, araliphatic or aromatic radical or together with $X_1$ and —N— represents a heterocyclic radical. When only one of the starting materials contains a sulfonic acid amide group of the formula —$SO_2NH_2$, the amide nitrogen atom of the coupling component must be alkylated or there must be present in the benzene radical of the diazo component or in the aromatic ester or amide radical of the acyl-acetic acid ester or amide used as coupling component a further substituent not imparting solubility in water, for example, an alkyl or alkoxy group, an acylamino group or a nitro group, but advantageously a halogen atom, such as a chlorine atom. When both starting components contain a sulfonic acid amide group, at least one sulfonic acid amide group must contain a substituent. In this connection there are advantageously used as ortho-hydroxy-diazo-compounds, diazo-compounds of ortho-hydroxy-amines of the benzene series which contain in the benzene nucleus, in addition to the hydroxyl and the amino group, a further substituent, for example, a sulfonic acid amide group as already mentioned or a halogen atom, for example, chlorine, an alkyl group, for example, methyl, an alkoxy group, for example, methoxy, a nitro group, a -CO-alkyl group, for example, —CO—CH3, or an acylamino group, for example, acetylamino. As ortho-hydroxy-aminobenzenes there come into consideration, for example, the following ortho-hydroxy-amines: 4-methyl-2-amino-1-hydroxybenzene, 4-methoxy-2-amino-1-hydroxybenzene, 4-chloro-2-amino-1-hydroxybenzene, 4-nitro-2-amino-1-hydroxybenzene, 5-nitro-2-amino-1-hydroxybenzene, 6-acetylamino-4-chloro- or -4-nitro-2-amino-1-hydroxybenzene, 5-nitro-4-chloro-2-amino-1-hydroxybenzene, 4-nitro-6-chloro-2-amino-1-hydroxybenzene, 6-nitro-4-chloro-2-amino-1-hydroxybenzene, 6-nitro-4-methyl-2-amino-1-hydroxybenzene, 3-amino-4-hydroxy-acetophenone, 6-nitro-4-acetylamino-2-amino-1-hydroxybenzene, 5-nitro-3-amino-4-hydroxy-acetophenone, 2-amino-1-hydroxybenzene-4-carboxylic acid amide, 4:6-dinitro- or -dichloro-2-amino-1-hydroxybenzene, 3:4:6-trichloro-2-amino-1-hydroxybenzene.

The following hydroxy-amines containing sulfonic acid amide groups lead to especially valuable monoazo-dyestuffs to be used as starting materials: 6-nitro-, 6-chloro- or 6-acetylamino-2-amino-1-hydroxybenzene-4-sulfonic acid amide, 4-nitro-2-amino-1-hydroxybenzene-6-sulfonic acid amide, 4-chloro-, 4-methyl- or 4-methoxy-2-amino-1-hydroxybenzene-5-sulfonic acid amide, 4-nitro-2-amino-1-hydroxybenzene-6-sulfonic acid-N-methyl or -phenyl-amide and especially 2-amino-1-hydroxybenzene-4- or -5-sulfonic acid amide, 2-amino-1-hydroxybenzene-4-sulfonic acid-N-methyl-, -N-ethyl-, -N-isopropyl-, -N-n-butyl-, -N-β-hydroxyethyl-, -N-β-methoxyethyl-, -N-β-chlorethyl-, -N-cyclohexyl-, -N-phenyl-, -N-benzyl-, -N-ethylphenyl-, -N-dimethyl- or -N-diethyl-amide, and the corresponding 2-amino-1-hydroxybenzene-5-sulfonic acid amides, and also 2-amino-1-hydroxybenzene-4-sulfonic acid -pyrrolidide, 2-amino-1-hydroxybenzene-5-sulfonic acid-pyrrolidide or -morpholide and 6-nitro-2-amino-1-hydroxybenzene-4-sulfonic acid-pyrrolidide.

The acyl-acetic acid esters or amides serving as coupling components for making the monoazo-dyestuffs may contain an aliphatic or aromatic acyl radical, for example, an acetyl, naphthoyl or benzoyl radical, which may, if desired, contain a non-salt-forming substituent. They are made by the ordinary known methods for making β-keto-carboxylic acid esters or amides.

The acyl-acetic acid amides can be made from acyl-acetic acid alkyl esters by heating the esters with the chosen amine alone or in an inert solvent. An especially advantageous method for making acetoacetic acid esters or amides consists, as is known, in reacting diketene with an aliphatic, alicyclic or aromatic hydroxy- or amino-compound; furthermore other acyl-acetic acid amides can be obtained from the resulting acetoacetic acid amides by condensing the acetoacetic acid amide with an acyl halide, for example, benzoyl chloride, chlorobenzoyl chloride or the like to form acyl-acetoacetic acid amides, and saponifying the acetyl radical in the latter compounds.

As coupling components for making the mono-azo-dyestuffs used as starting materials the following may be mentioned:

(a) Acyl-acetic acid esters and amides free from sulfonic acid amide groups, which are to be coupled only with diazo-compounds containing sulfonic acid amide groups, such as acetoacetic acid ethyl- or methylester, acetoacetic acid phenyl ester, acetoacetic acid cyclohexyl ester, acetoacetic acid parachlorophenyl or paramethylphenyl ester, and also the corresponding benzoyl-, 4-chloro-benzoyl-, 4-methyl-benzoyl-, 4-methoxy-benzoyl- or naphthoyl-acetic acid esters, acetoacetic acid amide, acetoacetic acid-N-methyl-, -N-ethyl-, -N-isopropyl-, -N-butyl-, -N-dimethyl-, -N-diethyl-, -N-dibutyl- or -N-β-hydroxyethyl-amide, aceto acetic acid-N-methyl- anilide or -N-ethyl-anilide, acetoacetylamino-cyclohexane, acetoacetylaminobenzene, 1-acetoacetylamino-4-fluorobenzene, 1-acetoacetylamino-2-trifluoromethyl-4-chlorobenzene, 1-acetoacetylamino-3-trifluoromethylbenzene, 1-acetoacetylamino-2-methylbenzene, 1 - acetoacetylamino - 2:5 - dimethylbenzene, 1-acetoacetylamino-2- or -4-ethylbenzene, 1-acetoacetylamino-2:5-dichlorobenzene, 1 - acetoacetylamino-4-methyl- or 4-methoxybenzene, benzoyl-acetylamino-cyclohexane, benzoyl-acetylamino-benzene, 1-benzoyl-acetylamino-2- or -3- or -4-chlorobenzene, 1-(4'-methyl-benzoyl-acetylamino)-4-methylbenzene, or 1-(4'-methoxy-benzoyl-acetylamino)-4-chlorobenzene, and furthermore 1-acetoacetylamino-2- or -3- or -4-chlorobenzene which leads to especially valuable starting materials for the present process; and furthermore (b) Those containing sulfonic acid amide groups such as 1-acetoacetoxy-benzene-4-sulfonic acid amide, 1-acetoacetylamino-benzene-2- or -3- or -4-sulfonic acid amide, 1 - acetoacetylamino - 2 - methylbenzene - 5 - sulfonic acid amide, 1-acetoacetylamino-2-chlorobenzene-5-sulfonic acid amide, 1-benzoyl-acetylamino-benzene-4-sulfonic acid amide, 1-acetoacetylaminobenzene-2- or -3- or -4-sulfonic acid-N-methylamide. Valuable results are obtained in the process of this invention by starting from monoazo-dyestuffs which are obtained from these coupling components containing sulfonic acid amide groups and ortho-hydroxy-diazo-compounds of the benzene series containing a sulfonic acid amide group and bound to the nitrogen atom of the sulfonic acid amide group an aryl group or a higher alkyl radical, that is to say, one containing at least 4 carbon atoms.

The coupling of the ortho-hydroxy-diazo-compounds with the acyl-acetic acid esters or amides can be carried out by the usual methods in themselves known, advantageously in a neutral to alkaline medium, for example, in the presence of sodium acetate.

At the end of the coupling reaction the dyestuffs can easily be separated from the coupling mixture by filtration for the purpose of metallization, as they are only slightly water-soluble. They are advantageously used in the form of filter cakes without intermediate drying. In some cases it is also possible to carry out the treatment with the agent yielding cobalt directly in the coupling mixture without any intermediate separation.

The monoazo-dyestuffs serving as starting materials for the present process and obtainable in the manner described above are in general not very easily soluble in water even in the form of their alkali compounds. However, some of them are sufficiently soluble in the latter form to be used for dyeing wool from dyebaths which require no addition of an acid.

The treatment with the agent yielding cobalt is carried out in the present process in such manner that a cobaltiferous dyestuff is obtained which contains less than one atom of cobalt in complex union per molecule of monoazo-dyestuff. Accordingly, the metallization is advantageously carried out with those agents yielding cobalt and by those methods which yield complex cobalt compounds of the aforesaid constitution. It is generally of advantage to use less than one atomic proportion of cobalt per molecular proportion of dyestuff and/or to carry out the treatment with the agent yielding cobalt in a weakly acid to alkaline medium. Accordingly, those cobalt compounds are especially suitable for carrying out the process which are stable to alkaline media, for example, complex cobalt compounds of aliphatic dicarboxylic acids or hydroxycarboxylic acids, such, for example, as complex cobalt compounds of oxalic acid, lactic acid, glycollic acid, citric acid and especially tartaric acid.

As agents yielding cobalt there may also be used in the present process simple cobalt compounds such as cobalt sulfate or cobalt acetate and if desired cobalt hydroxide. With the aid of these simple cobalt compounds the treatment of the monoazo-dyestuffs used as starting materials can also be carried out in a weakly acid medium.

The conversion of the dyestuffs into the complex cobalt compounds is advantageously carried out with the application of heat, under atmospheric or superatmospheric pressure, if desired, in the presence of suitable additions, for example, salts of organic acids, bases, organic solvents or other agents assisting the formation of complexes.

In a special form of the process a mixture of two different metallizable monoazo-dyestuffs is used, both of which dyestuffs correspond to the general definition given above or one of which corresponds to that definition and the other is an ortho:ortho'-dihydroxy-monoazo-dyestuff free from sulfonic acid and carboxylic acid groups, and which advantageously contains a substituted or unsubstituted sulfonic acid amide group. The treatment with the agent yielding cobalt is in this case likewise carried out in such manner that a cobaltiferous dyestuff is obtained which contains less than one atom of cobalt in complex union per molecule of monoazo-dyestuff.

The ortho:otrho' - dihydroxy - monoazo - dyestuffs used with those of the Formula 1 as starting materials in this form of the process can be made, for example, by coupling an ortho-hydroxy-diazo-compound of the benzene series free from sulfonic acid and carboxylic acid groups with a coupling-component capable of coupling in ortho-position relatively to a hydroxyl group, which coupling component is also free from sulfonic acid and carboxylic acid groups. As ortho-hydroxy-diazo-compounds of the benzene series there come into consideration, for example, those obtainable from the above-mentioned ortho-hydroxy-amines. As coupling components there may be mentioned those of the benzene or naphthalene series and also of the pyrazolone series. As examples of such coupling-components there may be mentioned: 1-phenyl-3-methyl - 5 - pyrazolone, 1-(3'- or -4'-chlorophenyl)-3-methyl - 5 - pyrazolone, 4-methyl-, 4-tertiary-amyl- or 4-acetylamino-1-hydroxy-benzene, 2-hydroxynaphthalene, 6-bromo - 2 - hydroxynaphthalene, 1-acetylamino-, 1-butyrylamino- or 1-benzoylamino-7-hydroxynaphthalene and also 5-chloro- and 5:8-dichloro-1-hydroxynaphthalene.

The products obtainable by the present process are new. They are complex cobalt compounds of ortho:-ortho'-dihydroxy-monoazo-dyestuffs free from sulfonic acid and carboxylic acid groups, in which the ratio of the number of cobalt atoms bound in complex union to the number of monoazo-dyestuff molecules bound to the cobalt in complex union is smaller than 1:1, and advantageously about 1:2, and in which at least one of the monoazo-dyestuffs present in the complex, but advantageously both dyestuffs, correspond to the general formula (1) 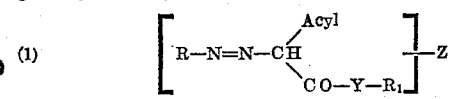

in which R represents an aromatic radical of the benzene series which contains a hydroxyl group in ortho-position relatively to the azo-linkage, Y represents an oxygen atom or an —NH—, or -N-alkyl-group, $R_1$ represents an aliphatic, cycloaliphatic or aromatic radical, and Z represents an aromatically bound sulfonic acid amid group, and in which, when Z represents a —$SO_2NH_2$ group, Y represents an -N-alkyl-group or the dyestuff molecule contains a further substituted aromatically bound sulfonic acid amide group or an aromatically bound substituent not imparting solubility in water, advantageously a halogen atom.

Especially valuable are the compounds of this kind which contain two monoazo-dyestuffs corresponding to the general Formula 1, and among these principally those which contain two monoazo-dyestuffs of the same constitution.

The new cobaltiferous dyestuffs are soluble in water and in weakly acid aqueous media, and are of better solubility than the starting materials used for making them. They are suitable for dyeing or printing a very wide variety of materials, above all for dyeing animal materials such as silk, leather and especially wool, but also for dyeing or printing synthetic fibers of superpolyamides or superpolyurethanes. They are above all suitable for dyeing from weakly alkaline to neutral to weakly acid baths, advantageously acetic acid baths. The wool dyeings so produced are distinguished by their levelness, good properties of wet fastness, very good fastness to decatizing and carbonizing, and very good fastness to light.

The following examples illustrate the invention, the parts and percentages being by weight:

*Example 1*

4.24 parts of the dyestuff from diazotized 2-amino-1-hydroxybenzene-4-sulfonic acid methylamide and acetoacetic acid-ortho-chloranilide, which dyestuff corresponds to the formula

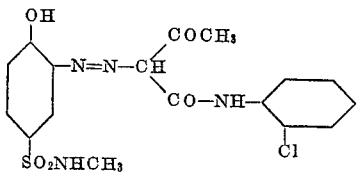

are dissolved in 300 parts of water and 2.6 parts of sodium hydroxide solution of 30 per cent. strength. The solution is heated to about 80° C. and mixed with 25 parts of a cobalt sulfate solution having a cobalt content of about 1.18 per cent., and stirred for 30 minutes at 80–85° C. At the end of this period the formation of the complex is complete. The mixture is filtered while hot, and the filtrate is evaporated in vacuo. The cobalt complex so obtained is a water-soluble brown powder which dissolves in sulfuric acid with an orange-yellow coloration and in sodium carbonate solution with a yellow-brown coloration, and dyes wool from a weakly alkaline, neutral or weakly acid bath full reddish yellow tints having good properties of fastness.

By using instead of 2-amino-1-hydroxybenzene-4-sulfonic acid methylamide, 2-amino-1-hydroxybenzene-4-sulfonic acid-β-hydroxy-ethylamide, there is obtained by the above process a cobaltiferous dyestuff which also dyes wool fast reddish yellow tints and is distinguished by an improved levelling capacity.

Similar dyestuffs which dye wool from a weakly acid or neutral bath the tints given in column III of the following table, are obtained by treating with an agent yielding cobalt in the manner described above the dyestuffs obtainable from the diazo-components and coupling-components mentioned in columns I and II.

|  | I | II | III |
|---|---|---|---|
| 1 | 2-Amino-1-hydroxybenzene-4-sulfonic acid amide. | Acetoacetic acid-N-methylanilide. | reddish yellow. |
| 2 | 2-Amino-1-hydroxybenzene-4-sulfonic acid methylamide. | Acetoacetic acid meta-chloranilide. | Do. |
| 3 | 2-Amino-1-hydroxybenzene-4-sulfonic acid amide. | Acetoacetic acid ortho-anisidide. | Do. |
| 4 | 4-Nitro-6-acetylamino-2-amino-1-hydroxy-benzene. | Acetoacetic acid anilide metasulfonic acid amide. | brownish yellow. |
| 5 | 4-Nitro-2-amino-1-hydroxy-benzene. | ___do___ | reddish yellow. |
| 6 | 2-Amino-1-hydroxybenzene-4-sulfonic acid-di-methylamide. | Acetoacetic acid para-chloranilide. | Do. |
| 7 | 2-Amino-1-hydroxybenzene-4-sulfonic acid-iso-propylamide. | Acetoacetic acid meta-chloranilide. | Do. |
| 8 | 2-Amino-1-hydroxybenzene-4-sulfonic acid-anilide. | Acetoacetic acid anilide meta-sulfonic acid amide. | reddish yellow. |
| 9 | 2-Amino-1-hydroxybenzene-4-sulfonic acid amide. | Acetoacetic acid-2:5-dimethoxy-4-chloranilide. | Do. |
| 10 | 2-Amino-1-hydroxybenzene-5-sulfonic acid amide. | Acetoacetic acid meta-chloranilide. | brownish yellow. |
| 11 | 2-Amino-1-hydroxybenzene-4-sulfonic acid-butylamide. | Acetoacetic acid anilide meta-sulfonic acid amide. | yellow. |
| 12 | 4:6-Dichloro-2-amino-1-hydroxybenzene. | ___do___ | brown-yellow. |
| 13 | 4-Chloro-2-amino-1-hydroxybenzene. | ___do___ | Do. |
| 14 | 2-Amino-1-hydroxy-benzene-4-sulfonic acid-4'-chloranilide. | Acetoacetic acid-iso-propylamide. | yellow. |
| 15 | 2-Amino-1-hydroxy-benzene-4-sulfonic acid-ethylamide. | Acetoacetic acid ortho-chloranilide. | Do. |
| 16 | 2-Amino-1-hydroxy-benzene-4-sulfonic acid-di-ethylamide. | Acetoacetic acid anilide meta-sulfonic acid amide. | brownish yellow. |
| 17 | 2-Amino-1-hydroxy-benzene-4-sulfonic acid-N-methylamide. | ___do___ | Do. |
| 18 | 2-Amino-1-hydroxy-benzene-4-sulfonic acid-cyclohexylamide. | ___do___ | Do. |
| 19 | 2-Amino-1-hydroxy-benzene-4-sulfonic acid-methylamide. | Benzoyl-acetic acid anilide. | yellow. |
| 20 | 2-Amino-1-hydroxy-benzene-4-sulfonic acid-4'-chloranilide. | Acetoacetic acid ethyl ester. | Do. |
| 21 | ___do___ | Acetoacetic acid amide | Do. |
| 22 | 2-Amino-1-hydroxy-benzene-4-sulfonic acid-methylamide. | Acetoacetic acid-2:6-di-methylanilide. | Do. |
| 23 | 2-Amino-1-hydroxy-benzene-4-sulfonic acid anilide. | Acetoacetic acid ethyl-amide. | Do. |
| 24 | 2-Amino-1-hydroxybenzene-5-sulfonic acid amide. | Acetoacetic acid ortho-chloranilide. | reddish yellow. |
| 25 | 4-Chloro-2-amino-1-hydroxybenzene-5-sulfonic acid amide. | Acetoacetic acid anilide. | Do. |
| 26 | 4-Chloro-2-amino-1-hydroxybenzene-6-sulfonic acid amide. | ___do___ | Do. |
| 27 | 2-Amino-1-hydroxybenzene-4-sulfonic acid pyrrolidide. | ___do___ | yellow. |
| 28 | 2-Amino-1-hydroxybenzene-4-sulfonic acid-4'-chloranilide. | Acetoacetic acid di-ethylamide. | Do. |
| 29 | ___do___ | Acetoacetic acid cyclohexylamide. | Do. |
| 30 | 4-Nitro-2-amino-1-hydroxybenzene-6-sulfonic acid amide. | Acetoacetic acid anilide. | yellow brown. |
| 31 | 2-Amino-1-hydroxybenzene-4-sulfonic acid amide. | Acetoacetic acid meta-trifluoromethyl anilide. | yellow. |
| 32 | ___do___ | 1-Acetoacetylamino-2-chloro-5-trifluoro-methylbenzene. | Do. |
| 33 | ___do___ | Acetoacetic acid ortho-fluoranilide. | Do. |

The structural formulae of some of the monoazo dyestuffs used to make the complex cobalt compounds disclosed in the preceding table are:

| monoazo dyestuff No. | formula |
|---|---|
| 2 | [structure: OH, N=N-CH(COCH₃)(CO-NH-phenyl-Cl), SO₂NH-CH₃] |
| 6 | [structure: OH, N=N-CH(COCH₃)(CO-NH-phenyl-Cl), SO₂N(CH₃)CH₃] |

| monoazo dyestuff No. | formula |
|---|---|
| 8 | OH, N=N–CH(COCH₃)(CONH–C₆H₄–SO₂NH₂), SO₂NH–C₆H₁₁ |
| 12 | Cl-substituted OH, N=N–CH(CO–CH₃)(CO–NH–C₆H₄–SO₂NH₂), Cl |
| 14 | OH, N=N–CH(COCH₃)(CONH–CH(CH₃)₂), SO₂NH–C₆H₁₀–Cl |
| 19 | OH, N=N–CH(CO–C₆H₅)(CO–NH–C₆H₅), SO₂NH–CH₃ |
| 20 | OH, N=N–CH(COCH₃)(CO–O–C₂H₅), SO₂NH–C₆H₄–Cl |
| 27 | OH, N=N–CH(COCH₃)(CO–NH–C₆H₅), SO₂–N(CH₂CH₂)(CH₂CH₂) (morpholino) |
| 31 | OH, N=N–CH(COCH₃)(CO–NH–C₆H₄–CF₃), SO₂NH₂ |

Example 2

4.21 parts of the dyestuff from diazotized 2-amino-1-hydroxybenzene-4-sulfonic acid methylamide and 1-(4'-chlorophenyl)-3-methyl-5-pyrazolone and 4.24 parts of the dyestuff from diazotized 2-amino-1-hydroxybenzene-4-sulfonic acid methylamide and acetoacetic acid orthochloranilide are dissolved in 600 parts of water and 5.2 parts of a sodium hydroxide solution of 30 per cent. strength. The solution is heated to about 80° C. and mixed with 60 parts of a cobalt sulfate solution having a cobalt content of 1.18 per cent., and the mixture is stirred for 30 minutes at 80–85° C. At the end of this period the formation of the mixed complex is complete. The dyestuff is isolated by evaporating the solution. It is a water-soluble brown powder, which dyes wool from a weakly alkaline, neutral or acetic acid bath brownish yellow tints having good properties of fastness.

Further cobalt mixed complexes obtainable in the manner described above are given in the following table. In column III are given the tints of the dyeings obtained on wool from acetic acid or neutral baths with the cobalt complexes prepared from the initial monoazo-dyestuffs mentioned in columns I and II.

|  | I | II | III |
|---|---|---|---|
| 1 | 2-Amino-1-hydroxybenzene 4-sulfonic acid methylamide ⟶ acetoacetic acid orthochloranilide. | 4-Nitro-2-amino-1-hydroxybenzene ⟶ 4-Methyl-1-hydroxybenzene. | reddish brown. |
| 2 | ...do... | 2-Amino-hydroxybenzene-4-sulfonic acid amide ⟶ Acetoacetic acid anilide. | yellow. |
| 3 | ...do... | 2-Amino-1-hydroxybenzene-4-sulfonic acid isopropylamide ⟶ 2-Hydroxynaphthalene. | red brown. |
| 4 | ...do... | 2-Amino-1-hydroxybenzene-4-sulfonic acid amide ⟶ 5:8-Dichloro-1-hydroxynaphthalene. | reddish brown. |
| 5 | ...do... | 6-Acetylamino-4-nitro-2-amino-1-hydroxybenzene ⟶ 1-Acetylamino-7-hydroxynaphthalene. | olive. |
| 6 | ...do... | 6-Nitro-4-acetylamino-2-amino-1-hydroxybenzene ⟶ 1-Acetylamino-7-hydroxynaphthalene. | greenish olive. |
| 7 | ...do... | 5-Nitro-2-amino-1-hydroxybenzene ⟶ 1-Acetylamino-7-hydroxy-naphthalene. | greenish khaki. |

Example 3

0.5 part of the cobaltiferous dyestuff obtainable as described in the first paragraph of Example 1 is dissolved in 4000 parts of water, 10 parts of crystalline sodium sulfate are added, and 100 parts of well-wetted wool are entered at 40–50° C. in the resulting dyebath. 2 parts of acetic acid of 40 per cent. strength are then added, the bath is raised to the boil in the course of ½ hour, and dyeing is carried on for ¾ hour at the boil. The wool is finally rinsed with cold water and dried. There is obtained a level reddish yellow dyeing having good properties of fastness to washing and light.

Practically the same dyeing is obtained when no acetic acid is added to the dyebath.

A reddish yellow dyeing is also obtained by using in this example 100 parts of superpolyamide fibers (nylon fibers) instead of 100 parts of wool.

What we claim is:

1. A complex cobalt compound containing two monoazo dyestuffs so bound in complex union with a cobalt atom that the proportion of the number of cobalt atoms bound in complex union to the number of monoazo dyestuff molecules is smaller than 1:1, in which complex compound both monoazo dyestuffs present are o:o'-dihydroxy-monoazo dyestuffs free from sulfonic acid and carboxylic acid groups and at least one of them corresponds to the formula

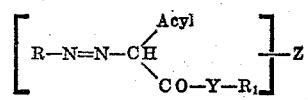

wherein R represents a benzene radical containing a hydroxyl group in ortho position relatively to the azo-linkage, Y represents a member selected from the group consisting of an oxygen atom, an —NH-group and an —N-alkyl-group, $R_1$ represents a member selected from the group consisting of an aliphatic, an alicyclic and an aromatic radical, and Z represents an aromatically bound sulfonic acid amide group attached to one of the radicals R and $R_1$, and, when Z represents an —$SO_2NH_2$-group, the dyestuff molecule containing in one of its aromatic radicals a member selected from the group consisting of fluorine, chlorine, lower alkyl and lower alkoxy.

2. A complex cobalt compound containing two monoazo dyestuffs so bound in complex union with a cobalt atom that the proportion of the number of cobalt atoms bound in complex union to the number of monoazo dyestuff molecules is smaller than 1:1, in which complex compound both monoazo dyestuffs present are o:o'-dihydroxy-monoazo dyestuffs free from sulfonic acid and carboxylic acid groups and correspond to the formula

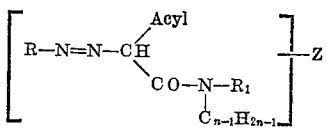

wherein R represents a benzene radical containing a hydroxyl group in ortho position relatively to the azo-linkage, $n$ represents a whole number which is at most 3, $R_1$ represents a benzene radical and Z a substituted sulfonic acid amide group which is aromatically bound to one of the radicals R and $R_1$.

3. A complex cobalt compound containing two monoazo dyestuffs so bound in complex union with a cobalt atom that the proportion of the number of cobalt atoms bound in complex union to the number of monoazo dyestuff molecules is smaller than 1:1, in which complex compound both monoazo dyestuffs present are o:o'-dihydroxy-monoazo dyestuffs free from sulfonic acid and carboxylic acid groups and correspond to the formula

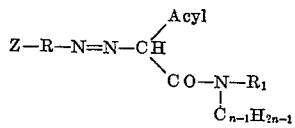

wherein R represents a benzene radical containing a hydroxyl group in ortho position relatively to the azo-linkage, $n$ represents a whole number which is at most 3, $R_1$ represents an aliphatic radical of low molecular weight and Z a substituted sulfonic acid amide group.

4. A complex cobalt compound containing two monoazo dyestuffs so bound in complex union with a cobalt atom that the proportion of the number of cobalt atoms bound in complex union to the number of monoazo dyestuff molecules is smaller than 1:1, in which complex compound both monoazo dyestuffs present are o:o'-dihydroxy-monoazo dyestuffs free from sulfonic acid and carboxylic acid groups and correspond to the formula

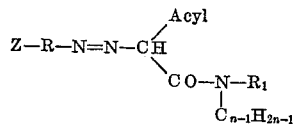

wherein R represents a benzene radical containing a hydroxyl group in ortho position relatively to the azo-linkage, $n$ represents a whole number which is at most 3, $R_1$ represents a benzene radical containing a sulfonic acid amide group and Z represents a substituted sulfonic acid amide group.

5. A complex cobalt compound containing two monoazo dyestuffs so bound in complex union with a cobalt atom that the proportion of the number of cobalt atoms bound in complex union to the number of monoazo dyestuff molecules is substantially 1:2, in which complex compound both monoazo dyestuffs present are o:o'-dihydroxy-monoazo dyestuffs free from sulfonic and carboxylic acid groups and correspond to the formula

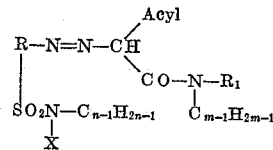

wherein R represents a benzene radical containing a hydroxyl group in ortho position relatively to the azo-linkage, X represents a member selected from the group consisting of a benzene radical and an aliphatic radical of low molecular weight, $m$ and $n$ represent whole members each of which is at most 3 and $R_1$ represents a member selected from the group consisting of a benzene radical and an aliphatic radical of low molecular weight, the acyl group containing carbon, hydrogen and oxygen atoms only.

6. A complex cobalt compound containing two monoazo dyestuffs so bound in complex union with a cobalt atom that the proportion of the number of cobalt atoms bound in complex union to the number of monoazo dyestuff molecules is substantially 1:2, in which complex compound both monoazo dyestuffs present are o:o'-dihydroxy-monoazo dyestuffs free from sulfonic and carboxylic acid groups and corresponds to the formula

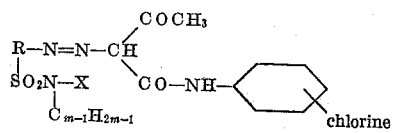

wherein R represents a benzene radical containing a hydroxyl group in ortho position relatively to the azo-linkage, X represents an aliphatic radical of low molecular weight and $m$ a whole number which is at most 2.

7. A complex cobalt compound containing two monoazo dyestuffs so bound in complex union with a cobalt atom that the proportion of the number of cobalt atoms bound in complex union to the number of monoazo dyestuff molecules is substantially 1:2, in which complex compound both monoazo dyestuffs present are o:o'-dihydroxy-monoazo dyestuffs free from sulfonic and carboxylic acid groups and correspond to the formula

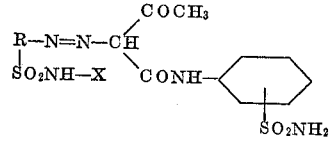

wherein R represents a benzene radical containing a hydroxyl group in ortho position relatively to the azo-linkage, and X represents a benzene radical.

8. A complex cobalt compound containing two monoazo dyestuffs so bound in complex union with a cobalt atom that the proportion of the number of cobalt atoms bound in complex union to the number of monoazo dyestuff molecules is substantially 1:2, in which complex compound both monoazo dyestuffs present are o:o'-dihydroxy-monoazo dyestuffs free from sulfonic and carboxylic acid groups and correspond to the formula

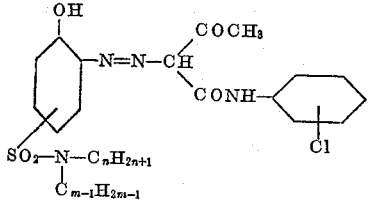

wherein $m$ and $n$ represent whole numbers each of which is at most 2.

9. A complex cobalt compound containing two monoazo dyestuffs so bound in complex union with a cobalt atom that the proportion of the number of cobalt atoms bound in complex union to the number of monoazo dyestuff molecules is substantially 1:2, in which complex compound both monoazo dyestuffs present are o:o'-dihydroxy-monoazo dyestuffs free from sulfonic and carboxylic acid groups and corresponds to the formula

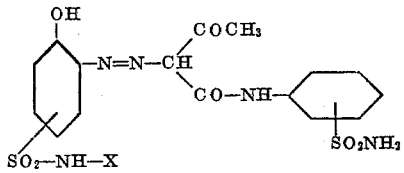

wherein X represents a benzene radical.

10. A complex cobalt compound containing two monoazo dyestuffs so bound in complex union with a cobalt atom that the proportion of the number of cobalt atoms bound in complex union to the number of monoazo dyestuff molecules is substantially 1:2, in which complex compound both monoazo dyestuffs present are o:o'-dihydroxy-monoazo dyestuffs free from sulfonic and carboxylic acid groups and correspond to the formula

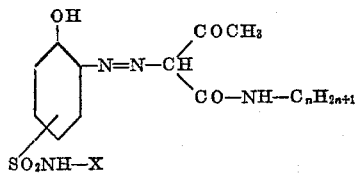

wherein X represents a benzene radical and $n$ a whole number which is at most 3.

11. The complex cobalt compound containing two monoazo dyestuffs so bound in complex union with a cobalt atom that the proportion of the number of cobalt atoms bound in complex union to the number of monoazo dyestuff molecules is substantially 1:2, and in which both monoazo dyestuff molecules correspond to the formula

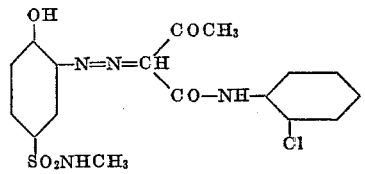

12. The complex cobalt compound containing two monoazo dyestuffs so bound in complex union with a cobalt atom that the proportion of the number of cobalt atoms bound in complex union to the number of monoazo dyestuff molecules is substantially 1:2, and in which both monoazo dyestuff molecules correspond to the formula

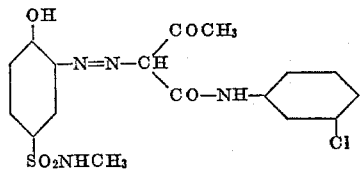

13. The complex cobalt compound containing two monoazo dyestuffs so bound in complex union with a cobalt atom that the proportion of the number of cobalt atoms bound in complex union to the number of monoazo dyestuff molecules is substantially 1:2, and in which both monoazo dyestuff molecules correspond to the formula

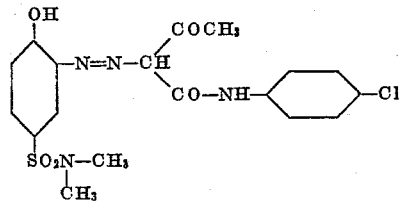

14. The complex cobalt compound containing two monoazo dyestuffs so bound in complex union with a cobalt atom that the proportion of the number of cobalt atoms bound in complex union to the number of monoazo dyestuff molecules is substantially 1:2, and in which both monoazo dyestuff molecules correspond to the formula

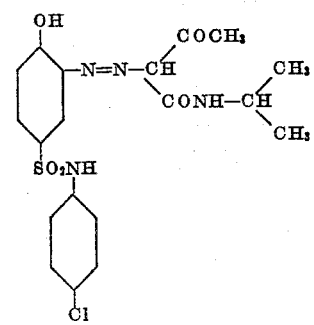

15. The complex cobalt compound containing two monoazo dyestuffs so bound in complex union with a cobalt atom that the proportion of the number of cobalt atoms bound in complex union to the number of monoazo dyestuff molecules is substantially 1:2, and in which both monoazo dyestuff molecules correspond to the formula

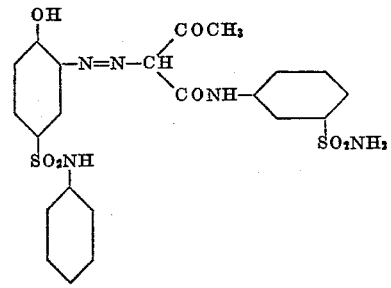

References Cited in the file of this patent
UNITED STATES PATENTS
2,305,095   Mackenzie _____ Dec. 15, 1942